United States Patent

[11] 3,602,377

| [72] | Inventor | Dewitt Sims<br>Saginaw, Mich. |
|---|---|---|
| [21] | Appl. No. | 800,913 |
| [22] | Filed | Feb. 19, 1969 |
| [45] | Patented | Aug. 31, 1971 |
| [73] | Assignee | Baker Perkins, Inc.<br>Saginaw, Mich. |

[54] HOOK TYPE PALLET OR TRAY UNSTACKER
21 Claims, 7 Drawing Figs.

[52] U.S. Cl. .................................................. 214/8.5 A,
198/20, 214/85 G, 221/232
[51] Int. Cl. ...................................................... B65g 59/10
[50] Field of Search............................................ 214/8.5 A,
8.5 F, 8.5 G, 8.5, 1 B, 8.5 B, 8.5 H, 8.5 C, 8.5 D,
8.5 R; 221/230, 232; 198/20, 34

[56] References Cited
UNITED STATES PATENTS
| 1,089,274 | 3/1914 | Sazenhofen | 214/8.5 D X |
| 2,097,587 | 11/1937 | Dearing | 214/8.5 D UX |

FOREIGN PATENTS
| 207,369 | 9/1966 | Sweden | 214/8.5 A |
| 1,075,304 | 7/1967 | Great Britain | 198/34 |

Primary Examiner—Gerald M. Forlenza
Assistant Examiner—George F. Abraham
Attorney—Learman, Learman & McCulloch ABSTRACT: A hook-type container pallet unstacker and method for sequentially removing pallets individually from a stack of pallets wherein the pallets are removed one by one by initially lifting only one side of the uppermost pallet in the stack to a position clearing the like side of the next uppermost pallet prior to moving the uppermost pallet laterally. A conveyor is provided to laterally move the pallet after it has been lifted and the pallet is unloaded on a second conveyor which is driven at a higher lineal speed than the lineal speed of the first conveyor. The stack of pallets is then indexed upwardly by an elevating mechanism in response to removal of the uppermost tray after which the next tray is similarly removed.

INVENTOR
DEWITT SIMS
BY
Learman, Learman & McCulloch

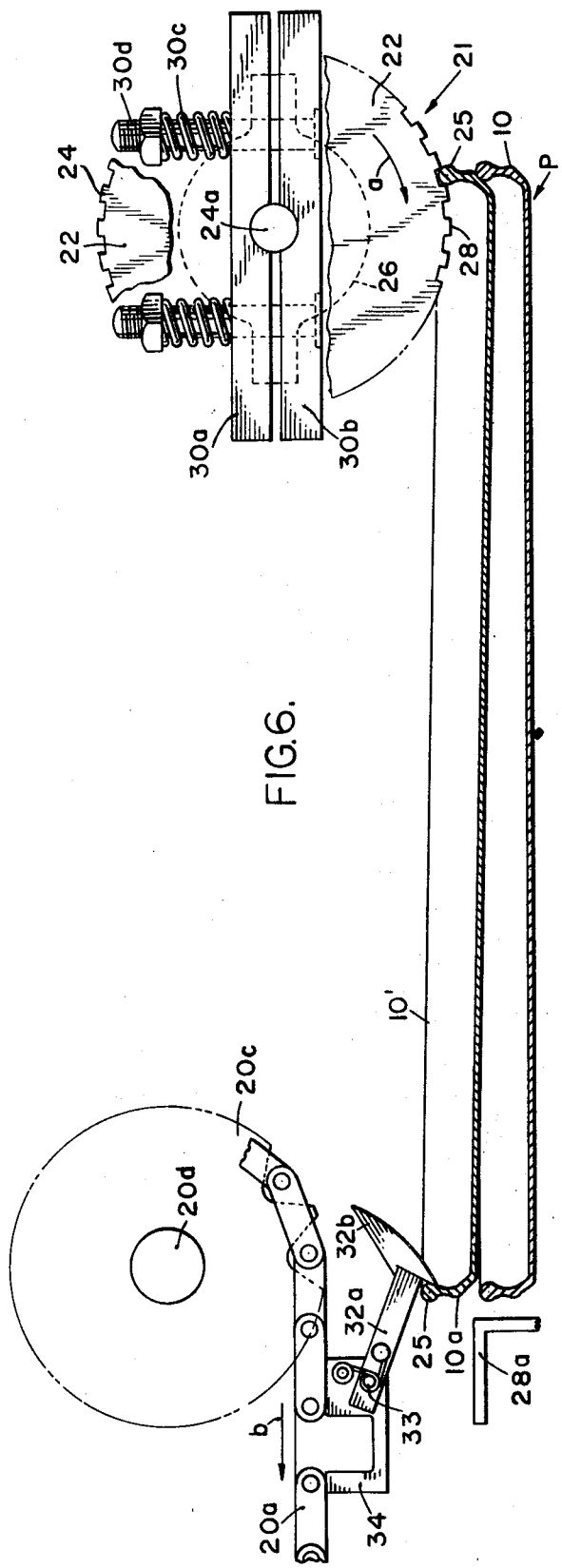
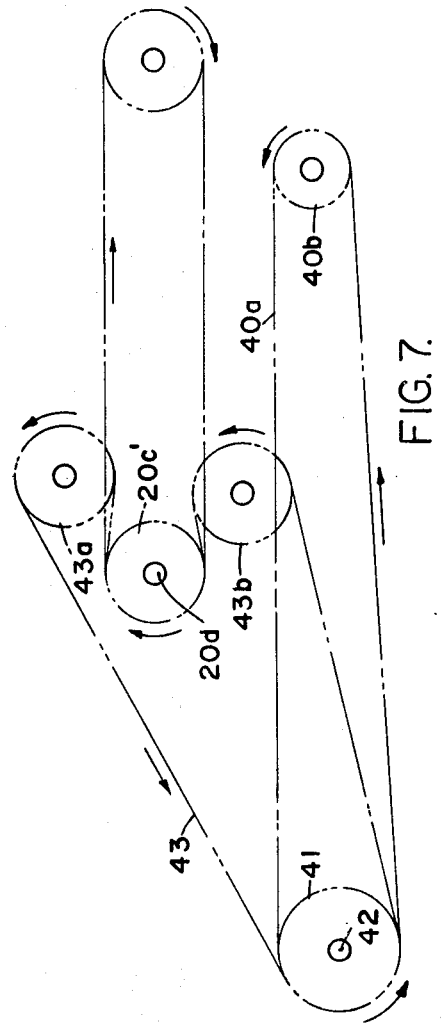

HOOK TYPE PALLET OR TRAY UNSTACKER

This invention relates to pallet-handling machinery and more particularly to a machine and method for unstacking nested pallets.

In large scale baking operations, the unstacking of a stack of nested pallets, pans, etc., presents a serious problem which can limit the production of a baking establishment. Moreover, due to the fact that such articles are generally constructed of metal, noise generated in the removal of the nested pans from the stack is a problem. This noise presents an undesirable environment in which to work and must be minimized.

An object of the present invention, therefore, is to provide a pallet unstacker which is relatively quiet-running while operating at high speeds.

Another object of the present invention is to provide a mechanically reliable pallet unstacker which has an increased unstacking capability.

Still another object of the present invention is to provide a hook-type pallet unstacker which lifts only one side of a pallet to be unstacked while restricting upward movement of the opposite side of the uppermost pallet to be removed from the stack.

It is yet another object of the present invention to provide a hook-type pallet unstacker which lifts one side of the uppermost pallet of the stack vertically prior to any horizontal movement thereof.

A still further object of the present invention is to provide a hook-type pallet unstacker having a hook which is biased into engagement with the inner surface of one side of the uppermost pallet of the stack for lifting the uppermost pallet vertically prior to moving it laterally.

Briefly, according to one form of the present invention which is illustrated, there is provided a hook-type pallet unstacker which sequentially removes the uppermost pallet in a stack of nested pallets. Lift means and limit means are provided on opposite sides of the uppermost pallet for lifting one side vertically while restricting the vertical movement of the other side. The lift means includes a hook means connected with a conveyor which moves the hook means and uppermost pallet vertically and then finally laterally against the force exerted by the yieldable limit means. The uppermost pallet is delivered to a second conveyor which travels at a higher lineal velocity than the first conveyor and thereby removes the pallet from the lift means.

Other objects and advantages of the present invention will become apparent to those of ordinary skill in the art with the following description when considered in relation to the accompanying drawings in which:

FIG. 6 is a greatly enlarged, fragmentary, side elevational view showing the lift means and the pallet movement restricting means engaging opposite sides of the uppermost pallet.

FIG. 7 is a schematic representation showing a typical drive system for the various elements.

Figure 1:
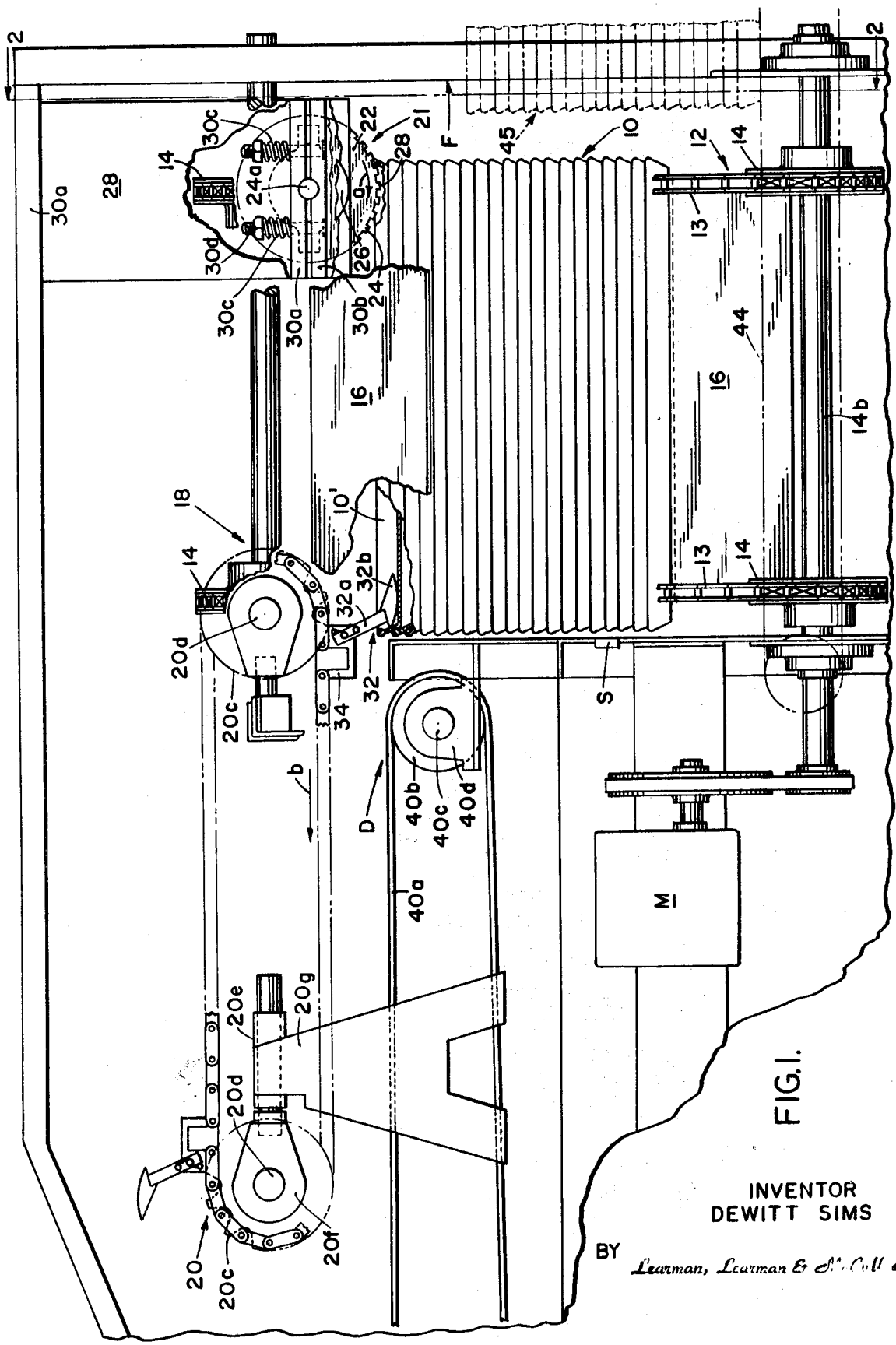
FIG. 1 is a side elevational view of a hook-type pallet unstacker constructed according to the invention.
Figure 2:
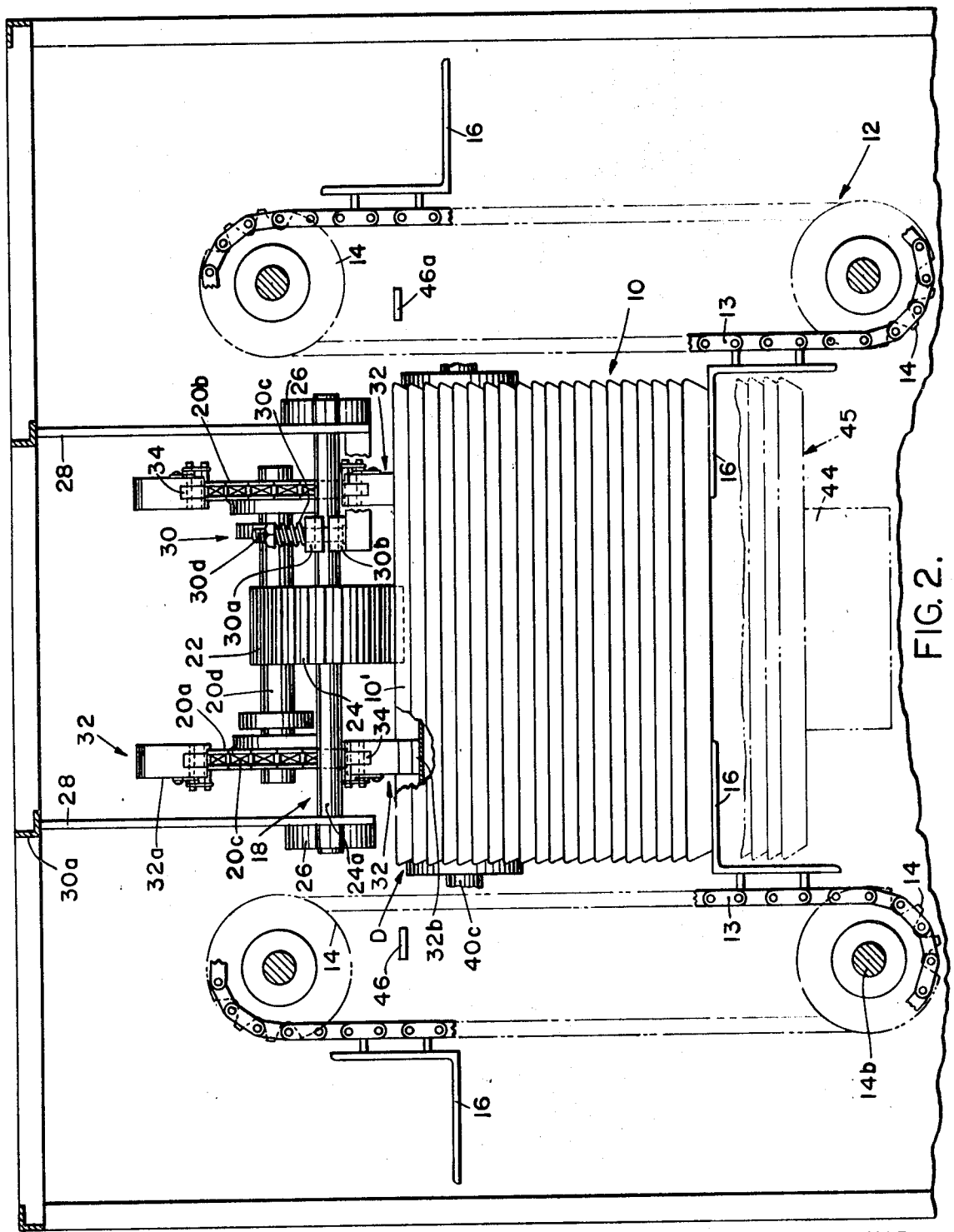
FIG. 2 is an end elevational view taken along the line 2—2 of FIG. 1.

Referring now to the drawings wherein similar numerals will refer to similar parts in the various Figures, a stack of nested pallets or trays P is shown generally at 10 in FIGS. 1 and 2 supported on an elevator assembly shown generally at 12. Referring particularly to FIGS. 1 and 2, elevator 12 includes vertically disposed spaced-apart pairs of endless chains 13 trained around sprockets wheels 14 and having tray-supporting spanning bars 16 arranged thereon at various intervals, as shown. The stack of nested trays is shown indexed to a position in which the uppermost tray or pallet can be unstacked.

Stacking beads 10a provided on the pallets or trays maintains a constant vertical spacing thereof.

The uppermost tray 10' in FIGS. 1 and 2 is in position to be lifted by lift means shown generally at 18 and including a first conveyor, shown generally at 20, for moving the tray 10' onto a more rapidly moving second conveyor, shown generally at D.

Mounted on structural framework generally designated F on the side of uppermost tray 10' opposite to that engaged by lift means 18 is movement restricting or limiting means, designated generally at 21, for limiting vertical movement of the opposite side of the uppermost pallet 10'. Movement limiting means 21 includes a wheel 22 mounted on a shaft 24a which is journaled in bearings 26. A suitable frame support such as 28 provides a rigid connection between frame part 30a and bearings 26. The outer circumferential portion of wheel 22, preferably is fabricated from resilient material, and has a plurality of teeth 24 cut therein. The spaced-apart teeth 24 engage the inner and outer surfaces of the uppermost edge bead 25 formed on the pans P as shown in FIG. 6 particularly. As can be seen in FIG. 1, the wheel 22 is so disposed that its lowermost portion at 28 lies below the upper edge 25 of a pallet P in position to be removed, hence, any force tending to rotate wheel 22 in the direction of the arrow $a$ in FIG. 1 will bias pan 10' downwardly. Thus, lateral movement of the uppermost pan will be restricted initially in a manner which will later be explained.

Also included with limit means 21 is means, shown generally at 30 (FIG. 2), for initially restraining the rotation of wheel 22. The mechanism 30 may be what is commonly referred to as a prony brake and includes superposed bars 30a and 30b frictionally engaging the shaft 24 to load it in a manner to restrict rotation of wheel 22. The magnitude of this loading is controlled by the biasing springs 30c mounted on the bolts 30d which connect the bars 30a and 30b.

Figure 4:
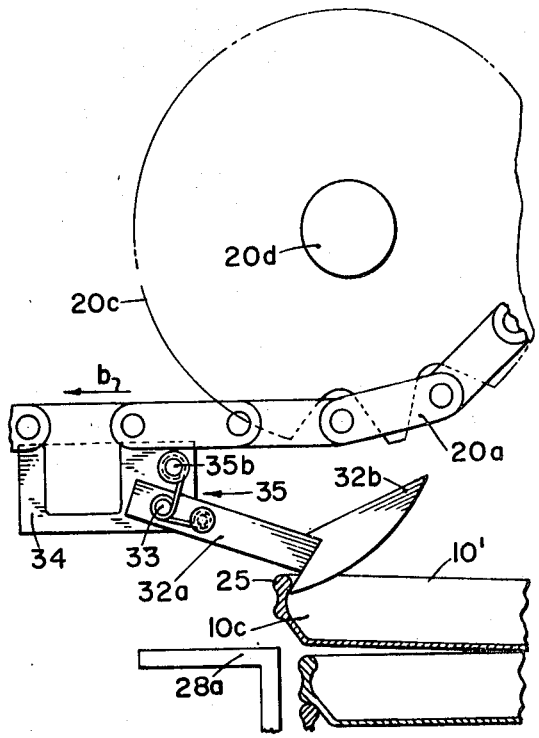
Figure 5:
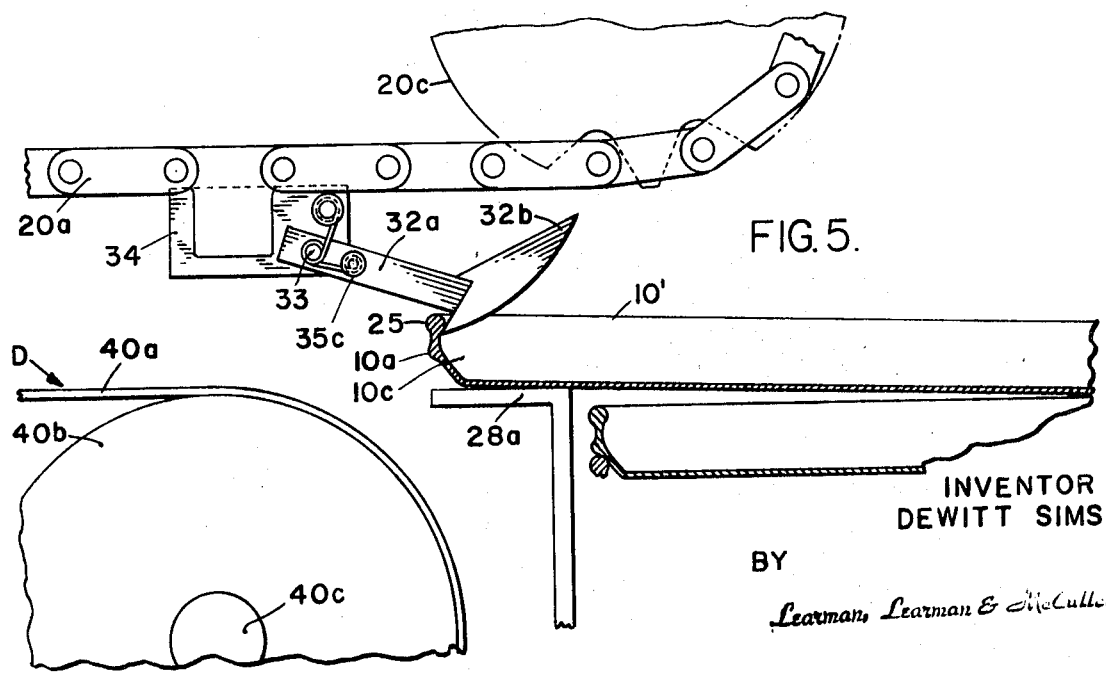

The lift means shown generally at 18 includes pairs of axially spaced-apart hook members generally designated 32 mounted on the spaced-apart endless chains 20a and 20b of conveyor assembly 20. The hook members 32 are pivotably mounted on chain mounted blocks 34 (see FIGS. 3–5) by means of pivot pins 33 and the mounting blocks 34 extend from the links of chains 20a and 20b at desired intervals. Provided for each hook 32 is biasing means 35, shown in more detail in FIG. 3, which includes spring means 35a having several coils wrapped about pin 33 and opposite distal coil shaped ends thereof secured about pins 35b which are attached to blocks 34 and pins 35c which are attached to the shank portions 32a of hooks 32. Mounted on outer end of the shank 32a of each hook 32 is a shoelike member 32b having a tip or hook portion 32c which is biased in FIG. 3 by the spring means 35a to move counterclockwisely into engagement with the sidewall surface of the top pallet 10' below the bead 25 on the upper edge of pan 10'.

Referring again to FIGS. 1 and 2, the spaced-apart chains 20a and 20b comprising lift hook moving conveyor 20 are trained around sprocket wheels 20c which are fixed on shafts 20d. Conventional chain tensioning assemblies 20e may suitably adjustably connect journal bearings 20f with conveyor support mounts 20g, as shown.

Figure 3:
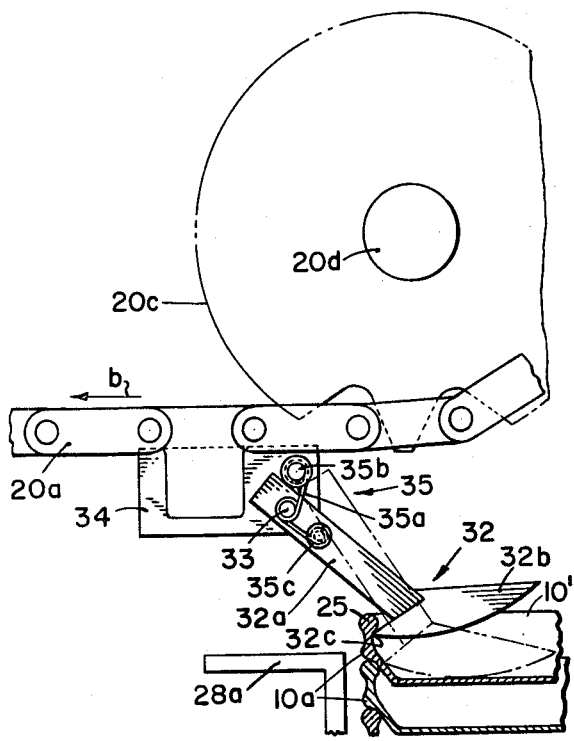
FIGS. 3–5 are exploded, fragmentary views showing the lift means lifting and moving the uppermost pallet at various consecutive stages of its removal.

As chains 20a and 20b rotate about sprocket wheels 20c, the shoe portion 32b of hook means 32 will engage the bottom of the uppermost pan 10', as shown in phantom lines in FIG. 3. Upon further travel of the chains of conveyor 20 in the direction indicated by the arrow "b," the portion 32c of the hook 32 will engage the tray sidewall surface 10c below the bead 25 of the uppermost pan. The component of force exerted on uppermost pan 10' in a lateral direction, will be resisted by wheel 22 so that hook shank 32a is initially pivoted counterclockwisely in FIG. 3. As shown in FIG. 6, any force exerted at 25 on wheel 22 tending to make wheel 22 rotate in the direction of the arrow "a," will tend to force the stacking bead 10a of the uppermost tray downwardly against the upper edge bead 25 on the underlying tray. The curvilinear bead 25 on the underlying tray functions as a pivot permitting the leading end of the uppermost tray to move in a virtually linear vertical path upwardly. Referring again to FIG. 3, as lateral force is exerted by the hook portion 32c under bead 25, shank 32a will continue pivot around pin 33 against the force exerted by biasing spring 35a. Upon continued advance of conveyor chain 20, the hook 32 finally ceases to rotate and all the components of force exerted by portion 32c on pan 10' are virtually lateral in direction and overcome the restricting force of prony brake 30, thereby causing wheel 22 to rotate and pan 10' to move to the position shown in FIG. 4.

Because the machine raises the uppermost pan 10' vertically prior to permitting lateral movement, much of the noise generated in denesting the trays is eliminated. Further rotation of the conveyor chain 20, in the direction shown by the arrow "a" in FIG. 5, will transfer uppermost pan 10' to the top of support 28a without the noise of the trailing edge engaging the leading sidewall of the underneath tray and the tray 10' will thereafter be pulled across to the second conveyor means shown generally at D.

Referring again to FIG. 1, the second conveyor means D may suitably comprise an endless belt 40a, one end of which is trained around a pulley 40b. Pulley 40b may be suitably mounted on a shaft 40c which is journaled in bearings at 40d. The opposite end of belt 40a is trained around a pulley 41 which functions as the drive pulley for the drive system shown generally in FIG. 7. Pulley 41 may be suitably mounted on a shaft 42 which is connected with a source of power, not shown such as a suitable electric motor. A drive belt for conveyor 20 is shown at 43, trained around drive pulley 41, idlers 43a and 43b, and a pulley 20c' mounted on shaft 20d. As can be seen in FIG. 7, the diameter of pulley 40b is smaller than the diameter of pulley 20c'. Hence, since both are drivingly connected with drive pulley 41, belt 40a will travel at a greater lineal speed than the chains 20a and 20b of conveyor 20. This will enable conveyor 40a to remove the pan 10' from engagement with portions 32c of hooks 32. Continued movement of pan 10' from the position shown in FIG. 5 will place pan 10' on conveyor belt 40a and for a short period, pan 10' will be moved in the direction of the arrow "a" by both conveyors 20 and 40. However, due to the higher speed of belt 40a, conveyor D will eventually furnish the sole driving force, permitting hook members 32 to clear the edge of pan 10a when they negotiate the left-hand sprocket wheels 20c.

Successive stacks of trays may be presented to the machine by means of a conveyor shown in phantom at 44 (FIG. 1) on which a stack 45 (also shown in phantom) is resting. Conveyor 44 is operated from a source of power (not shown) and will deliver a stack leftwardly until the stack contacts limit switch S which is mounted on the left side of the elevator shown in FIG. 1. Contact with limit switch S will stop the infeed conveyor 44 and close the circuit between a source of power (not shown) and the elevator drive motor, shown generally at M which incorporates a suitable gear reduction unit. The drive motor M is connected with the drive shaft 14b of elevator 12. An electric eye and an eye reflector are shown schematically at 46 and 46a (FIG. 2) mounted on opposite sides of elevator 12. Electric eye 46 emits a beam of light which is reflected by reflector 46a and detected by a photocell in electric eye 46. Elevator 12 moves the stack upward until the beam of light is interrupted, at which time photocell 46 automatically interrupts power to the elevator drive motor M to permit an uppermost tray to be unstacked.

As noted, when the stack 10 reaches the position shown in FIG. 1, the hook means 32 engage one side of the uppermost pan 10' and lift it upwardly while wheel 22 holds the opposite side against vertical and lateral movement. After lifting one side of the tray above the underlying tray, the conveyor 20 pulls the uppermost pan 10' from the stack onto the conveyor belt 40a which, because it is running at a higher speed than conveyor 20, removes the pan 10' from contact with the hook means 32. As the uppermost pallet is removed, the electric eye 46 is unblocked and power is supplied to drive motor M which raises the stack 10 an increment equaling the height of one of the pans. After the stack is raised this incremental distance, the light beam is again interrupted and power to drive motor M ceases. As the bottom of the first stack 10 passes the limit switch 8, power is again supplied to the drive motor for operating infeed conveyor 44 and the next stack of pallets is moved into the elevator. If desired, of course, a time delay may be utilized to delay the drive infeed conveyor 44.

It is to be understood that the invention is not limited to said details, and rather is described in the appended claims.

1. A hook-type pallet unstacker for sequentially unstacking a stack of nested pallets comprising: an unstacking station; means for sequentially delivering a stack of pallets to be unstacked to said unstacking station; laterally movable conveyor means; lift means including hook means pivotally mounted on and movable with said conveyor means for engaging the inner surface of one side of the uppermost pallet of said stack, said hook means being pivotal upwardly to lift said one side of said uppermost pallet as said hook means is moved bodily with said conveyor means; and means for substantially preventing movement of the opposite side of said uppermost pallet while said one side is being lifted to cause said hook means to initially pivot upwardly and lift said one side before said pallet is removed laterally from said stack by said hook means moving with said conveyor means.

2. A hook-type pallet unstacker as set forth in claim 1 wherein said lift means further includes bias means for biasing said hook means into engagement with said inner surface of said uppermost pan.

3. A hook-type pallet unstacker as set forth in claim 1 wherein said means for pivoting said hook means includes first conveyor means for transporting said hook means with respect to said stack of pallets.

4. A pallet unstacker for sequentially unstacking a stack of nested pallets comprising: an unstacking station; means for sequentially delivering a stack of pallets to be unstacked to said unstacking station; lift means for lifting one side of the uppermost pallet of said stack; means for substantially preventing lateral as well as vertical movement of the opposite side of said uppermost pallet while said one side is being lifted; and laterally movable conveyor means on which said lift means is mounted for thereafter removing said uppermost pallet supported by said lift means laterally in a forward direction.

5. The unstacker of claim 4 wherein said lift means includes pan gripping means swingably mounted on said conveyor means for gripping said uppermost pan; said conveyor means including means for laterally moving said gripping means after a pallet has been gripped, said means for preventing lateral movement including means for substantially preventing lateral movement of said gripped uppermost pallet to cause said lift means to swing upwardly and rearwardly while it is bodily moving forwardly with said conveyor means to initially move said uppermost pallet vertically upwardly until it clears the like wall of next uppermost pallet before proceeding laterally.

6. A pallet unstacker as set forth in claim 4 wherein said movement preventing means comprises rotatable means engaging said opposite side of said uppermost pallet for rotating in response to a predetermined lateral pull on said uppermost pallet.

7. A pallet unstacker as set forth in claim 6 wherein said movement preventing means includes adjustable means for variably restricting the rotation of said rotation means.

8. A pallet unstacker as set forth in claim 7 wherein said rotatable means includes a wheel mounted on a shaft and having resilient toothed sections about its outer periphery for engaging said opposite end of said uppermost pallet.

9. A hook-type pallet unstacker for sequentially removing pallets from a stack of pallets comprising; hook means for lifting the uppermost pallet of said stack; laterally moving conveyor means connected with said hook means for laterally moving said hook means whereby said uppermost pallet is removed from said stack, said hook means comprising a shank pivotally connected to said conveyor means and carrying a dish shaped pallet engaging shoe with a curvilinear outer surface terminating in a projecting hook portion; and elevator means for indexing said stack of pallets upwardly in response to removal of said uppermost pallet.

10. A hook-type pallet unstacker as set forth in claim 9 wherein spring means biases said hook means into engagement with the inner side surface of said one side of said uppermost pallet.

11. A hook-type pallet unstacker as set forth in claim 9 wherein said hook means is responsive to movement of said conveyor means for lifting one side of said uppermost pallet; means prevents lateral movement of said pallet and causes said hook means to pivot counter to the direction of travel of said conveyor means initially until virtually all pull exerted by said conveyor means is lateral.

12. A hook-type pallet unstacker for unstacking a stack of pallets comprising: means for supporting a stack of pallets; hook means for lifting the uppermost pallet from said stack; first conveyor means for laterally conveying said hook means and said uppermost pallet with respect to said stack after said uppermost pallet has been lifted; and second conveyor means driven at a faster rate of travel than said first conveyor means for receiving said uppermost pallet from said first conveyor means and conveying same subsequent to its removal from said stack at a speed to separate the hook means from hooking relation with the pallet.

13. A hook-type pallet unstacker for sequentially unstacking a stack of nested pallets, each having first and second side portions, comprising: means for supporting a stack of pallets; hook means for lifting said first side portion of the uppermost pallet to raise the bottom of said first side portion of said uppermost pallet above the top of said first side portion of the underlying pallet; laterally movable conveyor means on which said hook means is mounted for pulling the uppermost pallet generally laterally from said stack; and support surface means adjacent said stack, for supporting said uppermost pallet as it is pulled from said stack positioned to prevent the trailing second side portion of said uppermost pallet from engaging said first side portion of said underlying pallet.

14. A hook-type pallet unstacker as set forth in claim 13 further including second conveyor means driven at a faster rate of travel than said first conveyor means for receiving said uppermost pallet from said first conveyor means; said support surface means being positioned above the top edge of said underlying pallet and between said second conveyor means and said stack.

15. The combination defined in claim 13 in which said support surface means comprises a shelf situated forwardly adjacent the front of the stack of containers and, at a level relative to the path of said hook means such that it is engaged by a container being removed and furnishes a support surface for the container camming the rear of said container upwardly to clear the front of the next uppermost container, as the hook means moves the container laterally in a forward direction.

16. A hook-type container unstacker for sequentially removing nested containers from a stack comprising laterally moving conveyor means moving in a path above said stack and forwardly beyond said stack; dependent hook means for removing the uppermost container of said stack, connected with the laterally moving conveyor means and caused to move downwardly in a path to enter the uppermost container and engage the interior face of the one sidewall of the uppermost container in the nested stack of containers, and then laterally; and means movably connecting said hook means to said movable conveyor in a manner to permit the lower end of said hook means to move rearwardly and upwardly as the upper end of said hook means moves forwardly with said laterally moving conveyor so that said one sidewall of the container is first moved vertically upwardly when it is engaged by said laterally traveling hook means until it clears the like wall of the next uppermost container before proceeding laterally; elevator means for indexing said stack of containers upwardly after the uppermost container has laterally cleared said stack so that the stack can be raised upwardly; and means for indexing said elevator means upwardly to dispose one container at a time in position for unstacking.

17. The combination of claim 16 in which spring means normally biases the lower end of said hook means forwardly.

18. The combination defined in claim 16 in which said laterally movable conveying means comprises an endless member having a generally horizontal lower run passing at least partly above said elevator means and stack and extending forwardly beyond said elevator means and stack.

19. The combination defined in claim 18 in which said endless member has a generally vertically extending end run portion connecting with said lower run above said elevator means and between the sides thereof and the sides of a stack supported thereon.

20. A hook-type container unstacker for sequentially removing nested containers having internal projecting portions, from a stack thereof comprising: hook means; means for moving the hook means in a path down to enter the uppermost container in a stack, thence laterally to engage the interior face of the one sidewall of the uppermost container below its internal projecting portion, thence in a direction to lift the said one sidewall of the uppermost container vertically upwardly, and thence laterally to withdraw the uppermost container laterally from the stack; elevator means for indexing said stack of containers upwardly after the uppermost container has laterally cleared said stack; and means for indexing said elevator means upwardly to dispose one container at a time in position for unstacking.

21. The combination defined in claim 20 in which said means for moving the hook means comprises an endless conveyor, to which said hook means is pivotally connected, having a generally vertical end run portion disposed at one side of said elevator means inward of the said one sidewall of the uppermost container on the stack to move said hook means to enter the said uppermost container, and a lower run portion leading laterally therefrom and laterally beyond said elevator means and the stack supported thereon.